(12) United States Patent
Marcuse et al.

(10) Patent No.: US 6,310,999 B1
(45) Date of Patent: Oct. 30, 2001

(54) DIRECTIONAL COUPLER AND METHOD USING POLYMER MATERIAL

(75) Inventors: Dietrich Marcuse, Lincroft; Herman M. Presby, Highland Park, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/166,358

(22) Filed: Oct. 5, 1998

(51) Int. Cl.[7] ........................................ G02B 6/26
(52) U.S. Cl. .................. 385/42; 385/16; 385/50; 385/51; 385/40; 385/41; 385/132
(58) Field of Search .................. 385/16, 42–45, 385/50, 51, 131, 132, 39–41

(56) References Cited

U.S. PATENT DOCUMENTS

| | | | |
|---|---|---|---|
| 5,016,958 | * 5/1991 | Booth | 385/42 |
| 5,857,039 | * 9/2000 | Bosc et al. | 385/14 |
| 5,862,276 | * 1/1999 | Karras | 385/30 |
| 6,002,823 | * 12/1999 | Chandross et al. | 385/50 |
| 6,122,416 | * 9/2000 | Ooba et al. | 385/16 |

* cited by examiner

Primary Examiner—Ellen E. Kim
(74) Attorney, Agent, or Firm—Thomas, Kayden, Horstemeyer & Risley LLP

(57) ABSTRACT

An optical coupler and method is disclosed in which a polymer material is employed to optically couple a first and second waveguide in a transfer region. In the transfer region, the first and second waveguides are positioned in parallel separated by a specific distance. The polymer material has an index of refraction which varies with temperature. The optical switch device is controlled by adjusting the temperature of the polymer material to obtain a desired index of refraction, thereby resulting in the desired transfer of an optical wave from on waveguide core to another.

5 Claims, 4 Drawing Sheets

DIRECTIONAL COUPLER AND METHOD USING POLYMER MATERIAL

CROSS-REFERENCE TO RELATED APPLICATIONS

Not applicable.

STATEMENT REGARDING FEDERALLY SPONSORED RESEARCH OR DEVELOPMENT

Not Applicable.

FIELD OF THE INVENTION

The present invention relates to the field of optical waveguide technology and, more particularly, to the field of optical switches.

BACKGROUND OF THE INVENTION

Current communications networks throughout the world have embraced the use of optical fiber waveguide technology to provide a conduit of transmission components for voice, video, and data signals. Optical networks offer far greater bandwidth and reliability than do conventional electronic networks. As a consequence, current research efforts have been directed to expanding the capabilities of optical waveguide technology at reduced cost to aid in the acceleration of the conversion of the present electrical communications networks to optical communications networks.

Optical communications networks contain many different components. These include, but are not limited to, optical fiber cable, switches, attenuators, couplers, and many more such devices. Typically, these devices are comprised of a core surrounded by a cladding material. Both the materials used for the core and the cladding include silica or doped silica as well as many other similar materials. These materials are employed because they have a desirable index of refraction and as well as other properties which facilitate their use.

Even though current materials used in constructing the core and the cladding have many beneficial properties, it can be desirable to manipulate the properties of such materials to control the direction of the propagation of laser radiation through a network of waveguides. Specifically, it is often desirable to switch the propagation of a light wave from one waveguide to another. Consequently, there is a need for optical structures that facilitate the switching of optical signals between optical waveguides.

SUMMARY OF THE INVENTION

The present invention entails the use of polymer materials in optical switching. In one embodiment, first and second waveguide cores are formed on a substrate parallel to and in close proximity to each other in a transfer region for a specified length. The waveguide cores are surrounded by a polymer cladding which optically couples the first and second waveguide cores in the transfer region. The degree of optical coupling between the first and second waveguide cores in the transfer region is determined by the index of refraction of the polymer material. The index of refraction of the polymer material varies with the temperature of the polymer material. The transfer of an optical signal from one of the first and second waveguides into the opposite waveguide is accomplished by controlling the temperature of the polymer material, thereby controlling the index of refraction.

In another embodiment, the present invention may also be viewed as an optical switching method which begins with the step of positioning a first waveguide core to a second waveguide core in a transfer region where the first and second waveguide cores are in parallel for an identifiable length in the transfer region. Next, the first and second waveguide cores are optically coupled in the transfer region with a polymer cladding material which has an index of refraction which changes with the temperature of the polymer cladding. Finally, the optical coupling between the first and second waveguide cores in the transfer region is controlled by adjusting the temperature of the polymer cladding material, thereby adjusting the index of refraction of the polymer material.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Figure 1:
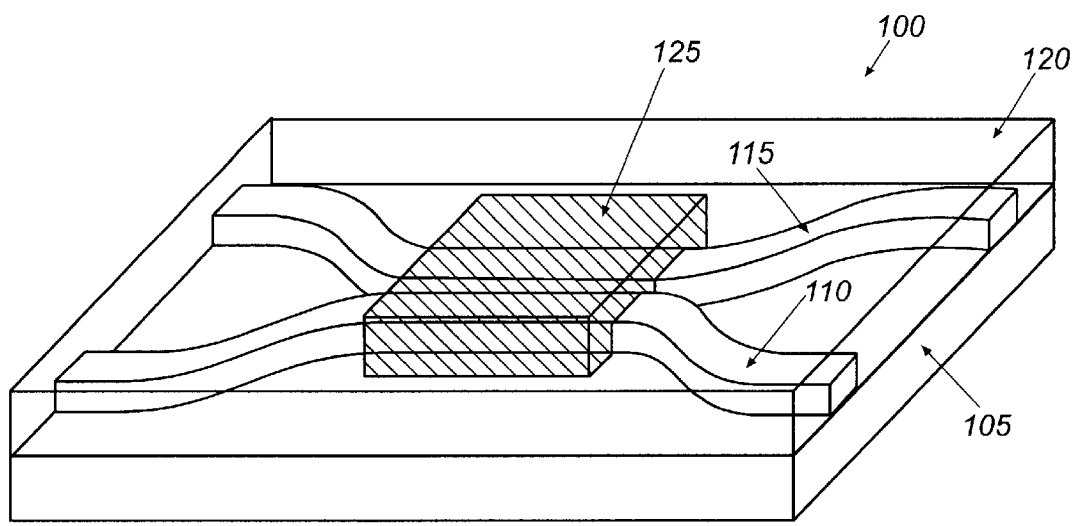
FIG. 1 shows an optical switching device according to an embodiment of the present invention.

Turning to FIG. 1, shown is an optical switching system 100 according to an embodiment of the present invention. The optical switching system 100 comprises a substrate 105 on which is formed a first waveguide core 110 and a second waveguide core 115. Although the first and second waveguide cores 110 and 115 are shown as having a square cross-section, waveguide cores with a different shaped cross-section may be used. A portion, for example, the bottom of the first and second waveguide cores 110 and 115 are in contact with the substrate 105. The remaining sides which include top, left, and right sides of the first and second waveguide cores 110 and 115 are surrounded by both a standard cladding material 120 and a polymer cladding material 125. In FIG. 1, the standard cladding material 120 is transparent so that the features of the optical switching system 100 are visible.

Figure 2:
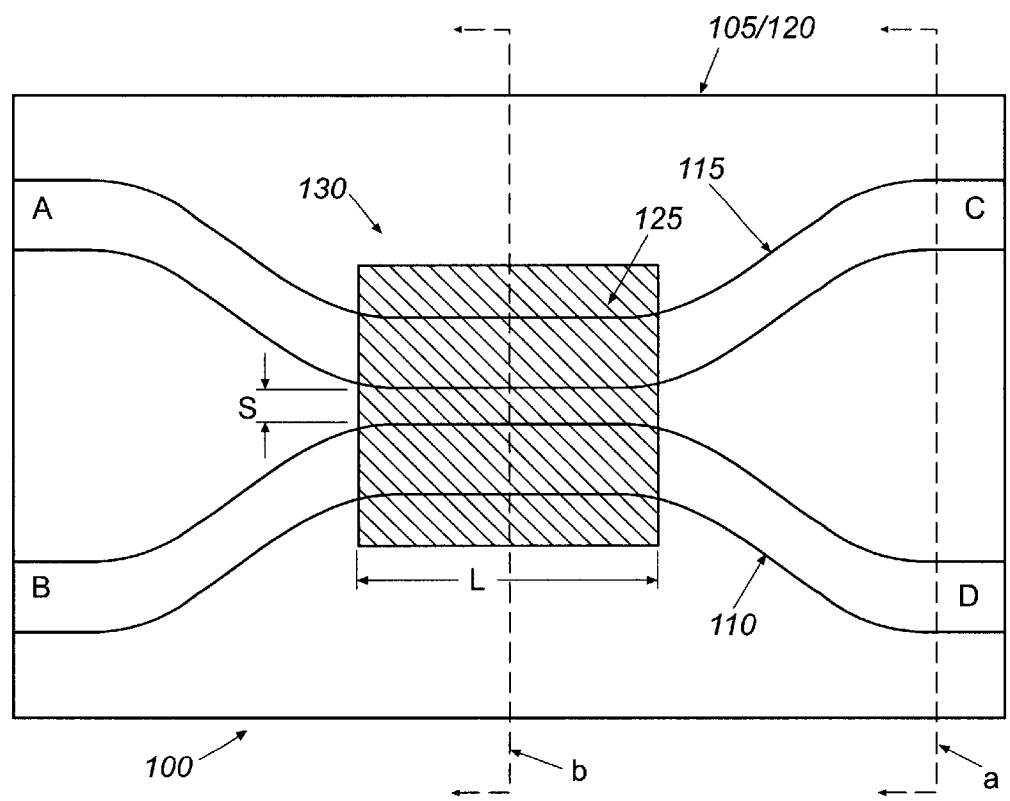
FIG. 2 shows a top view of the optical switching device of FIG. 1.

Referring to FIG. 2, shown is a top view of the optical switching system 100. The optical switching system 100 includes a transfer region 130 in which the first and second waveguide cores 110 and 115 are positioned in close proximity to and parallel to each other for an identifiable length L. The first and second waveguide cores 110 and 115 are separated in the transfer region 130 by separation S. The first waveguide core 110 includes an input port B and an output port D. The second waveguide core 115 includes an input port A and an output port C. FIG. 2 also shows first and second sectional lines a and b which show views discussed in later text. In the transfer region 130, the first and second waveguide cores 110 and 115 are in contact with polymer cladding 125.

Figure 3A:
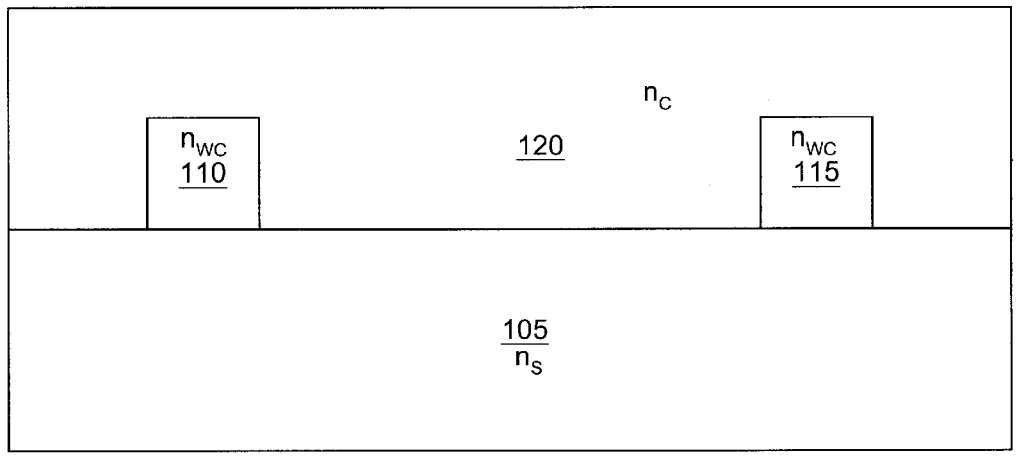
FIG. 3A shows a first sectional view of the optical switching device of FIG. 2.
Figure 3B:
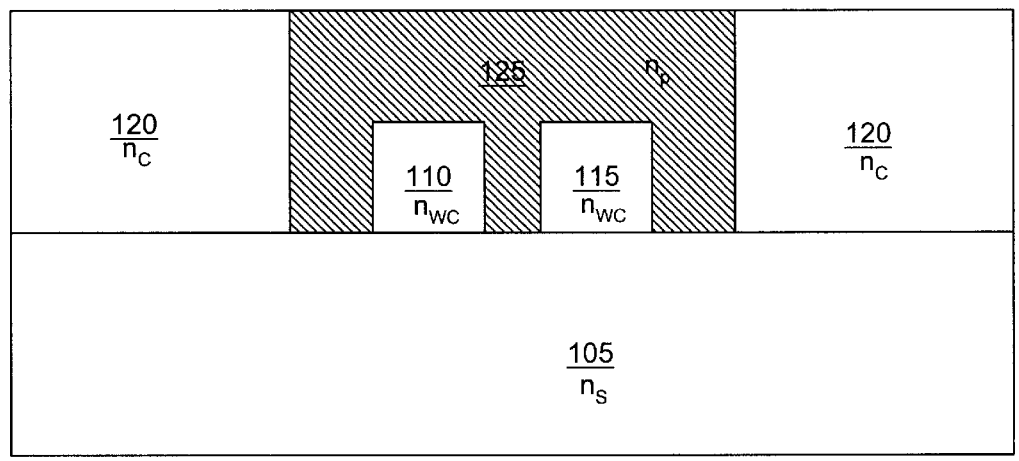
FIG. 3B shows a second sectional view of the optical switching device of FIG. 2.

Turning next to FIGS. 3A and 3B, shown are sectional views of the optical switching system 100 taken along the first and second sectional lines a and b (FIG. 2). In FIG. 3A, the substrate 105 has an index of refraction $n_S$ and the standard cladding material 120 has an index of refraction $n_C$. The first and second waveguide cores 110 and 115 both have an index of refraction $n_{WC}$. In order for an optical wave to be contained within the first and second waveguide cores 110 and 115, the index of refraction $n_{WC}$ is specified to be greater than the both the indexes of refraction $n_C$ and $n_S$. The sectional view of FIG. 3B taken along the second sectional line b runs through the polymer cladding material 125 in the transfer region 130. The polymer cladding material 125 has an index of refraction $n_P$ which varies with the temperature of the polymer cladding material 125.

The polymer cladding material 125 is taken from the category of materials classified as polymers which generally are chemical compounds with high molecular weight comprising a number of structural units linked together by covalent bonds. Polymers which qualify for use as the polymer cladding material 125 should generally possess the optical characteristics including an index of refraction that varies with temperature as will be discussed.

Although the first and second waveguide cores 110 and 115 comprise doped silica and the substrate 105 comprises silica, it is understood that other materials may be employed as known by those skilled in the art. Consequently, an exhaustive list of possible materials used to create these components is not offered herein.

It is understood that the fact that the polymer cladding material 125 completely surrounds the sides of the waveguide cores 110 and 115 that are not in contact with the substrate 105. However, it may be possible for example, that the polymer cladding material 125 only contact the first and second waveguide cores 110 and 115 in specified regions such as on the top surface of the first and second waveguide cores 110 and 115. According to an embodiment of the invention, the design is such that the polymer cladding material 125 comes into contact with the first and second waveguide cores 110 and 115 so that the propagation of light radiation through the first and second waveguide cores 110 and 115 can be manipulated by controlling the index of refraction $n_P$ of the polymer cladding material 125 relative to the index of refraction $n_{WC}$ of the first and second waveguide cores 110 and 115 to achieve certain advantages including the transfer of light radiation from the first waveguide core 110 to the second waveguide core 115 and vice versa.

The polymer cladding material 125 features a relatively high thermo-optic coefficient $\partial n_P/\partial T$ due to the fact that the index of refraction of polymers can vary significantly with changing temperature. For example, the thermo-optic coefficient $$\frac{\partial n_p}{\partial T}$$

generally may be as high as $-0.0001$ C.$^{-1}$ and even up to $-0.0003$ C.$^{-1}$, where $n_P$ is the refractive index of the polymer and T is temperature. In contrast, the thermo-optic coefficient of silica is much lower and of opposite polarity, being on the order of $+0.00001$ C.$^{-1}$. Consequently, the index of refraction of fused silica and other similar materials will not change significantly when subjected to heat, while the index of refraction $n_P$ of the polymer cladding material 125 will change significantly.

Figure 4:
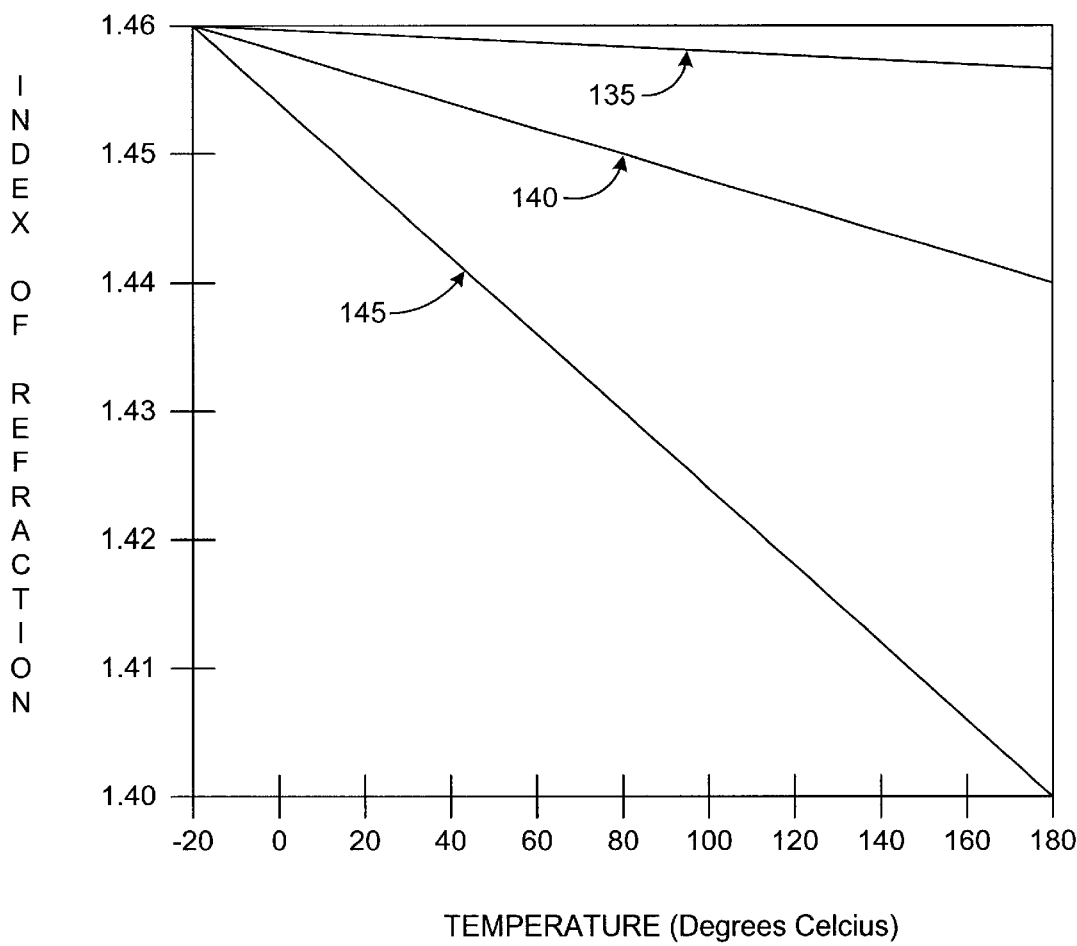
FIG. 4 shows a graph of the index of refraction of a polymer material as a function of temperature.

Referring to FIG. 4, shown is a graph depicting the index of refraction $n_P$ as a function of temperature in degrees Celsius of three example polymers which may be used according to the various embodiments of the present invention. Line 135 depicts the index of refraction of F/CA polymer which has a thermal coefficient of $-0.00002$ C.$^{-1}$, line 140 depicts the index of refraction of D-PMMA/D-FA polymer which has a thermal coefficient of $-0.0001$ C.$^{-1}$, and line 145 depicts the index of refraction of FA polymer which has a thermal coefficient of $-0.0003$ C.$^{-1}$. Note that the starting point at n=1.46 and Temperature =$-20°$ C. were chosen arbitrarily. Ultimately, the indexes of refraction of various polymers depend upon their composition and can vary over a relatively wide range as a function of temperature.

Turning back to FIG. 2, the operation of the optical switching system 100 is explained in the following discussion. In terms of a field description, it might be said that an overlap of electric fields of optical waves traveling through the first and second waveguide cores 110 and 115 while in the transfer region 130 provides a coupling mechanism. In terms of ray optics, it can be said that due to the close proximity of the first and second waveguide cores 110 and 115 in the transfer region 130, light rays traveling, for example, in the first waveguide core 110 can leak or tunnel to the second waveguide core 115 to accomplish an optical power exchange. In either case, if, for example, all of the optical power resides initially in the first waveguide core 110, the optical power is coupled in the transfer region 130 over to the second waveguide core 115 until all of the power is transferred to the second waveguide core 115. Once the transfer is complete, the process reverses itself and the optical power flows back into the first waveguide core 110. The transfer of optical power from the first waveguide core 110 and back is a single transfer cycle. Ideally, in a lossless device of great length, the transfer cycle would be repeated indefinitely.

In actuality, however, the transfer of optical power from the first waveguide core 110 to the second waveguide core 115 is a function of the index of refraction of the cladding in the transfer region 130 which, in this case, is the index of refraction $n_P$ of the polymer cladding material 125. For a specified index of refraction of the polymer cladding material 125 in the transfer region 130, the length of the transfer region 130 may be specified to accomplish a partial or complete transfer cycle of the optical power.

Thus, optical switching can be accomplished by choosing a first index of refraction $n_P$ of the polymer cladding material 125 and a corresponding length L of the transfer region 130 so that the exchange of optical power goes through a single transfer cycle. In this instance, the optical switching system 100 is in an un-switched state as any optical power that enters the first waveguide core 110 through input port B will exit out of the first waveguide core 110 through output port D. Likewise, any optical power that enters the second waveguide core 115 through input port A will exit out of the second waveguide core 115 through output port C.

The optical switching system 100 may be placed in a switched state by heating the polymer cladding material 125 to the specific temperature, for example, whereby the index of refraction $n_P$ is lowered to a value such that the optical coupling between the first and second waveguide cores 110 and 115 is reduced so that the exchange of optical power goes through only one half of a transfer cycle for the given length L. The actual temperature of the polymer cladding material 125 which results in the desired optical coupling depends upon the type of polymer cladding material 125 chosen as seen in FIG. 4. In this switched state, optical power that enters the first waveguide core 110 through input port B will exit out of the second waveguide core 115 through output port C. Likewise, any optical power that enters the second waveguide core 115 through input port A will exit out of the first waveguide core 110 through output port D.

In light of the foregoing discussion, it is useful to define a power exchange length $L_{EX}$ which is the length L necessary to achieve one half of a transfer cycle at a given index of refraction $n_P$. The power exchange length $L_{EX}$ is a function of the separation S between the first and second waveguide cores 110 and 115 in the transfer region 130.

Figure 5:
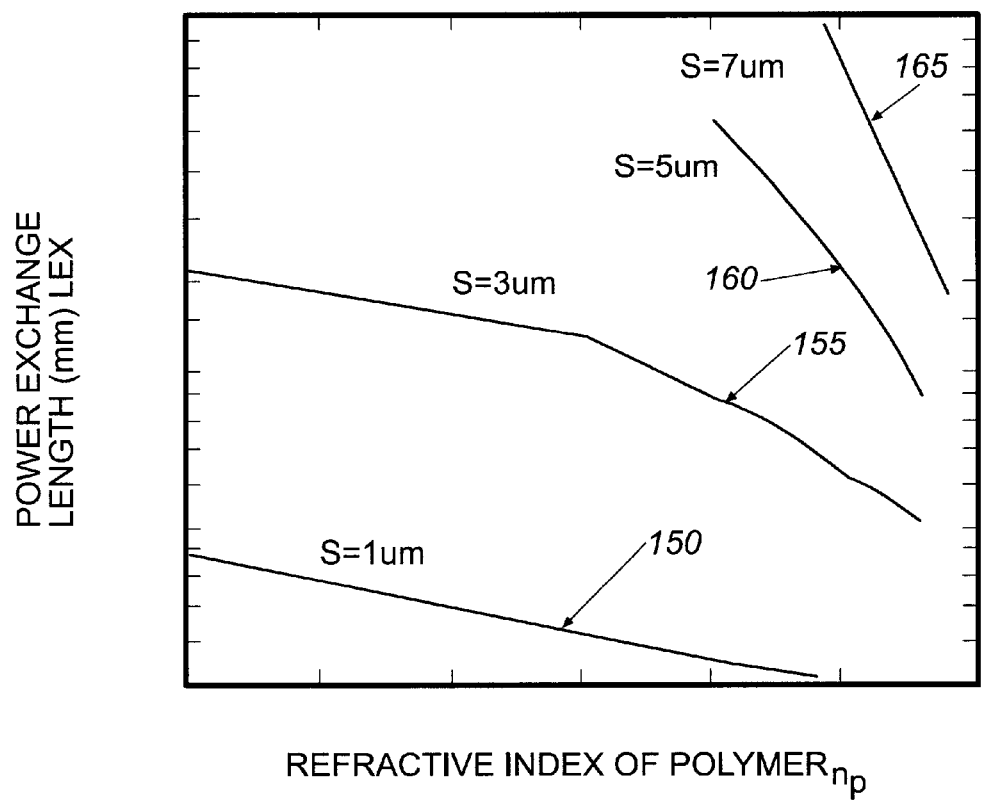
FIG. 5 shows a graph of the power exchange length of the optical switching device of FIG. 1 as a function of the index of refraction of a polymer material.

Referring then to FIG. 5, shown is a graph which depicts the power exchange length $L_{EX}$ as a function of the index of refraction $n_P$ of the polymer cladding material 125 for specific values of the separation S. As was stated in the previous discussion, to cause the optical switching system 100 to operate in an un-switched state for a given length L, the index of refraction $n_P$ is set so that the length $L=2L_{Ex}$. In a switched state, the index of refraction $n_P$ is set, for example, by heating to a value where the length $L=L_{EX}$. FIG. 5 shows that the optimum separation S involves a compromise between the length L and the degree of change in the index of refraction $n_P$ necessary to cycle from an un-switched state to a switched state. On one hand, it is desirable to keep the length L as short as possible to avoid undesirable losses into the coupling and switching process due to relatively high losses of the polymer (on the order of 1dB/cm). On the other hand, it is desirable to achieve the transition from an un-switched to a switched state and vice versa with as small a difference in the index of refraction $n_P$ as possible, thereby requiring as small a change of temperature in the polymer cladding material 125 as possible. However, a conflict occurs in that for smaller lengths L which translate into smaller power exchange lengths $L_{EX}$, a greater difference in the index of refraction $n_P$ is needed to achieve the desired transition.

The graph of FIG. 5 shows a range of curves corresponding to specific values for the separation S. First curve 150, for example, results when the separation S is equal to 1 $\mu$m. Note the slope of first curve 150 is relatively gradual requiring a significant change in index of refraction $n_P$ for a significant change in the power exchange length $L_{EX}$. The slope of the second curve 155 is less gradual where the separation S is equal to 3 $\mu$m. The slope of the third curve 160 where the separation S is equal to 5 $\mu$m is relatively steep resulting in a minimal change in the index of refraction $n_P$, however, the power exchange lengths $L_{EX}$ that correspond to the third curve 16 are generally greater than 2 millimeters. The forth curve 165 with a separation S of 7 $\mu$m is the steepest slope, but results in relatively large power exchange lengths $L_{EX}$.

Thus, according to the chart of FIG. 5, curves with small values for the separation S and small values for the power exchange lengths $L_{EX}$ have low slopes so that large changes in the index of refraction $n_P$ are needed to vary the power exchange length $L_{EX}$ by a factor of 2 to achieve the switching transition. If the separation S becomes larger, however, the slopes of the curves in FIG. 5 become steeper so that a smaller index difference, and hence a smaller temperature difference, is needed to achieve switching. This relaxation in the temperature range is accompanied by a longer transfer region length L.

Many variations and modifications may be made to the various embodiments of the present invention without departing substantially from the spirit and principles of the invention. All such modifications and variations are intended to be included herein within the scope of the present invention, as defined by the following claims.

Having thus described the invention, it is claimed:

1. An optical switching device, comprising:
    a substrate on which is formed and which contacts a first waveguide core and a second waveguide core, the first waveguide core having a portion not in contact with a substrate, and the second waveguide core having a portion not in contact with the substrate;
    a transfer region in which the first and second waveguide cores are positioned in parallel and in close proximity to each other for an identifiable length; and
    a single type of polymer cladding material surrounding all portions of the waveguide cores not in contact with the substrate and optically coupling the first and second waveguide cores in the transfer region, wherein the optical coupling between the first and second waveguide cores is controlled by altering a temperature of the single type of polymer cladding material.

2. The optical switching device of claim 1, wherein the polymer cladding material has an thermal coefficient of up to approximately $-0.0003$ C.$^{-1}$.

3. The optical switching device of claim 1, wherein
    the first and second optical waveguide cores, wherein each waveguide core has a square cross-section having a bottom side, a top side, a right side, and a left side, the bottom side contacting a substrate; and
    a cladding material covering the top, right, and left sides of each of the first and second optical waveguide cores outside of the transfer region.

4. The optical switching device of claim 3, wherein the polymer cladding material covers the top, right, and left sides of each of the first and second optical waveguide cores inside the transfer region.

5. A method for optical switching, comprising the steps of:
    providing a substrate on which is formed and which contacts a first waveguide core and a second waveguide core;
    positioning the first waveguide core in close proximity to the second waveguide core, the first and second waveguide cores being parallel for an identifiable length in the transfer region;
    optically coupling the first and second waveguide cores in the transfer region with a single type of polymer cladding material, the single type of polymer cladding material surrounding all portions of the waveguide cores not in contact with the substrate and having an index of refraction which changes with temperature; and
    controlling the optical coupling between the first and second waveguide cores in the transfer region by controlling the temperature of the single type of polymer cladding material that surrounds all portions of the first and second waveguide cores not in contact with the substrate.

* * * * *